US011052378B2

(12) United States Patent
Hengst et al.

(10) Patent No.: US 11,052,378 B2
(45) Date of Patent: Jul. 6, 2021

(54) DIESEL OXIDIZING CATALYTIC CONVERTER

(71) Applicant: UMICORE AG & CO. KG, Hanau-Wolfgang (DE)

(72) Inventors: Christoph Hengst, Butzbach (DE); Christoph Reith, Motten (DE); Michael Schiffer, Hanau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/316,239

(22) PCT Filed: Jul. 13, 2017

(86) PCT No.: PCT/EP2017/067651
§ 371 (c)(1),
(2) Date: Jan. 8, 2019

(87) PCT Pub. No.: WO2018/015259
PCT Pub. Date: Jan. 25, 2018

(65) Prior Publication Data
US 2019/0314791 A1 Oct. 17, 2019

(30) Foreign Application Priority Data
Jul. 19, 2016 (EP) ..................................... 16180191

(51) Int. Cl.
*B01J 21/04* (2006.01)
*B01J 21/06* (2006.01)
(Continued)

(52) U.S. Cl.
CPC ............ *B01J 23/44* (2013.01); *B01D 53/944* (2013.01); *B01D 53/9468* (2013.01);
(Continued)

(58) Field of Classification Search
CPC . B01J 21/04; B01J 21/06; B01J 21/063; B01J 21/08; B01J 21/12; B01J 23/02;
(Continued)

(56) References Cited

U.S. PATENT DOCUMENTS 6,602,820 B1 8/2003 Gobel et al.
7,576,031 B2 8/2009 Beutel et al.
(Continued)

FOREIGN PATENT DOCUMENTS

EP 1 101 528 A2 5/2001
EP 2 000 639 A1 12/2008
(Continued)

OTHER PUBLICATIONS

International Search Report for PCT/EP2017/067651, dated Oct. 27, 2017 in English and German Language (8 pgs.).

*Primary Examiner* — Cam N. Nguyen
(74) *Attorney, Agent, or Firm* — Smith, Gambrell & Russell, LLP

(57) ABSTRACT

The present invention relates to a diesel oxidizing catalytic converter which comprises a supporting body with a length L which extends between a first end surface a and a second end surface b, and catalytically active material zones A and B of different composition which are arranged on the supporting body, wherein —material zone A comprises palladium or platinum and palladium in a weight ratio Pt:Pd of <1 and, starting from the end surface a, extends to from 20% to 80% of the length L, and —material zone B comprises platinum and palladium in a weight ratio Pt:Pd of <10 and extends to from 80% to 100% of the length L, and wherein material zone B is arranged above material zone A and the weight ratio Pt:Pd in relation to the material zones A and B is from 1.5 to 3.0.

20 Claims, 2 Drawing Sheets

Figure 1:
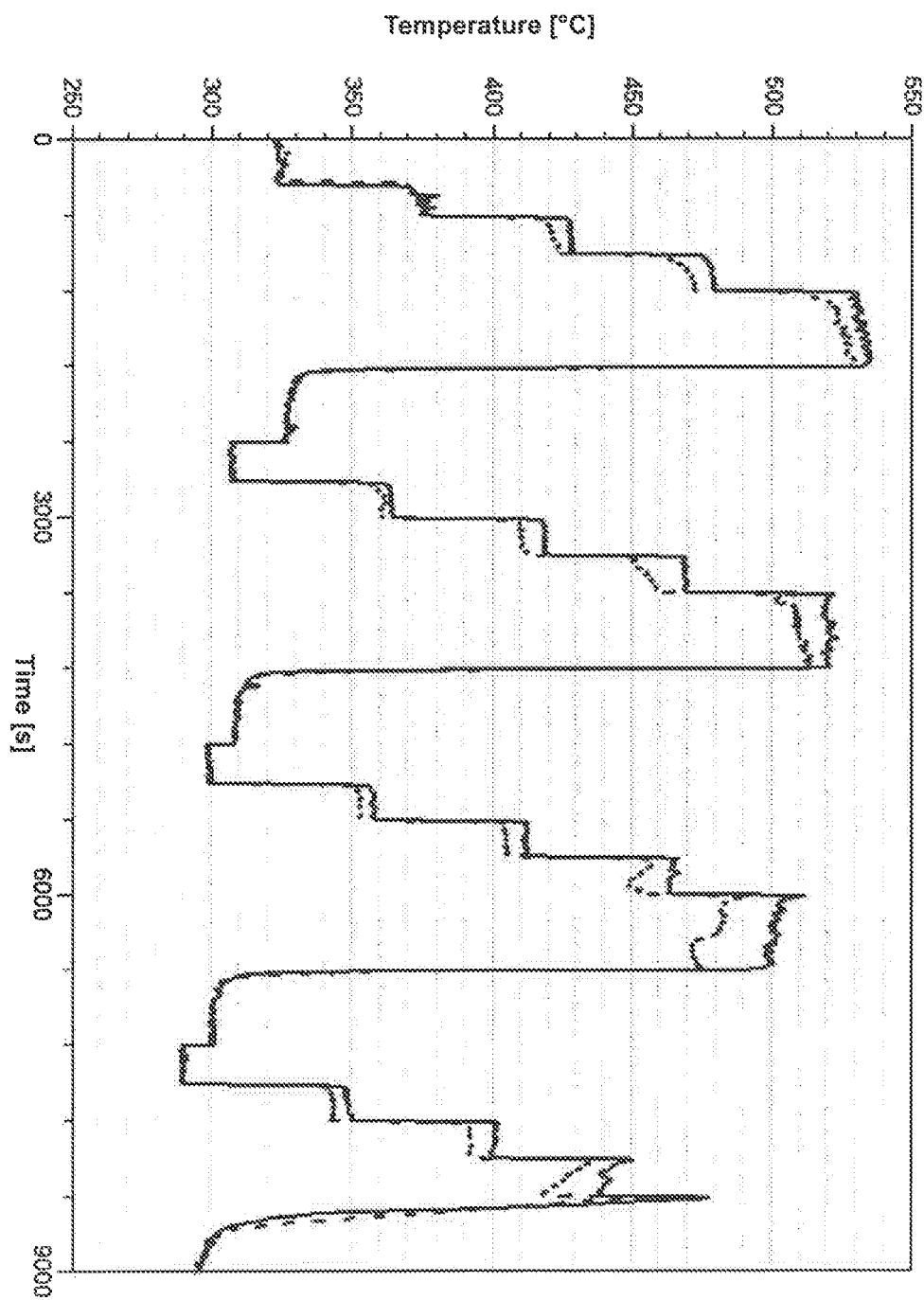

(51) Int. Cl.

| | |
|---|---|
| *B01J 21/08* | (2006.01) |
| *B01J 21/12* | (2006.01) |
| *B01J 23/02* | (2006.01) |
| *B01J 23/42* | (2006.01) |
| *B01J 23/44* | (2006.01) |
| *B01J 23/58* | (2006.01) |
| *B01J 35/04* | (2006.01) |
| *F01N 3/035* | (2006.01) |
| *F01N 3/10* | (2006.01) |
| *F01N 3/28* | (2006.01) |
| *B01D 53/94* | (2006.01) |
| *B01J 23/10* | (2006.01) |
| *B01J 37/02* | (2006.01) |

(52) U.S. Cl.
CPC ............... *B01J 23/10* (2013.01); *B01J 35/04* (2013.01); *B01J 37/0215* (2013.01); *F01N 3/035* (2013.01); *F01N 3/103* (2013.01); *F01N 3/28* (2013.01); *F01N 3/2828* (2013.01); *B01D 2255/1021* (2013.01); *B01D 2255/1023* (2013.01); *B01D 2255/204* (2013.01); *B01D 2255/2042* (2013.01); *B01D 2255/2092* (2013.01); *B01D 2255/20707* (2013.01); *B01D 2255/9022* (2013.01); *B01D 2255/9032* (2013.01); *B01D 2255/9202* (2013.01); *F01N 2370/02* (2013.01); *F01N 2510/0684* (2013.01)

(58) Field of Classification Search
CPC ... B01J 23/42; B01J 23/44; B01J 23/58; B01J 35/04; F01N 3/035; F01N 3/103; F01N 3/28; F01N 3/2828; B01D 53/944; B01D 53/9468

See application file for complete search history.

(56) References Cited

U.S. PATENT DOCUMENTS

| | | | | |
|---|---|---|---|---|
| 7,875,573 B2* | 1/2011 | Beutel | ................... | B01J 29/7007 502/339 |
| 7,947,238 B2* | 5/2011 | Deeba | ................... | B01J 35/04 423/213.2 |
| 8,246,923 B2* | 8/2012 | Southward | ........... | B01J 37/0242 423/213.5 |
| 8,567,674 B2* | 10/2013 | Conaghan | ............ | G09F 3/10 235/384 |
| 8,637,426 B2* | 1/2014 | Hoke | ................... | B01J 23/40 502/339 |
| 8,652,429 B2* | 2/2014 | Sumiya | ................... | B01J 21/12 423/213.2 |
| 8,668,877 B2* | 3/2014 | Wei | ................... | B01D 53/944 422/177 |
| 8,802,016 B2* | 8/2014 | Grubert | ................ | B01D 53/944 422/177 |
| 8,858,904 B2* | 10/2014 | Punke | ................... | F01N 13/0097 423/213.5 |
| 9,005,559 B2* | 4/2015 | Sumiya | ................ | B01J 37/0244 423/213.2 |
| 9,034,269 B2* | 5/2015 | Hilgendorff | ......... | B01J 29/7415 422/170 |
| 9,333,490 B2* | 5/2016 | Kazi | ................... | B01J 35/0006 |
| 9,341,098 B2* | 5/2016 | Cole | ................... | F01N 3/0231 |
| 9,440,192 B2* | 9/2016 | Hoke | ................... | F01N 3/10 |
| 9,533,295 B2* | 1/2017 | Muller-Stach | ........... | B01J 29/44 |
| 9,566,568 B2* | 2/2017 | Yin | ................... | B01J 23/44 |
| 9,579,638 B2* | 2/2017 | Fedeyko | .............. | B01J 37/0244 |
| 9,868,115 B2* | 1/2018 | Sumiya | ................... | B01J 29/068 |
| 9,950,316 B2* | 4/2018 | Yin | ................... | B01J 23/44 |
| 9,993,771 B2* | 6/2018 | Voss | ................... | B01D 53/944 |
| 10,137,414 B2* | 11/2018 | Hoke | ................ | B01D 53/9454 |
| 10,201,807 B2* | 2/2019 | Larsson | ................ | B01J 29/763 |
| 10,335,776 B2* | 7/2019 | Sung | ................... | B01J 35/0006 |
| 10,376,867 B2* | 8/2019 | Blakeman | ........... | B01D 53/944 |
| 10,443,463 B2* | 10/2019 | Hoyer | .................. | F01N 3/0814 |
| 10,864,502 B2* | 12/2020 | Sung | ................... | B01D 53/945 |
| 2008/0045405 A1 | 2/2008 | Beutel et al. | | |
| 2010/0180582 A1* | 7/2010 | Mueller-Stach | ..... | B01J 35/0006 60/297 |
| 2010/0257843 A1 | 10/2010 | Hoke et al. | | |
| 2010/0290964 A1 | 11/2010 | Southward et al. | | |
| 2011/0099975 A1 | 5/2011 | Bailey et al. | | |
| 2011/0286900 A1* | 11/2011 | Caudle | ..................... | B01J 23/42 423/213.5 |
| 2012/0124975 A1 | 5/2012 | Wei et al. | | |
| 2012/0213674 A1 | 8/2012 | Schuetze et al. | | |
| 2013/0089481 A1 | 4/2013 | Sumiya et al. | | |
| 2013/0149222 A1 | 6/2013 | Blakeman et al. | | |
| 2014/0030158 A1 | 1/2014 | Takagi et al. | | |
| 2015/0165422 A1* | 6/2015 | Sung | ................... | B01J 37/0244 423/213.5 |
| 2015/0202604 A1 | 7/2015 | Sumiya et al. | | |
| 2018/0029016 A1* | 2/2018 | Sung | ................... | B01J 23/002 |
| 2018/0104677 A1* | 4/2018 | Blakeman | ................ | B01J 35/04 |
| 2018/0272280 A1* | 9/2018 | Voss | ................... | F01N 3/2066 |
| 2019/0262809 A1* | 8/2019 | Sung | ................... | B01J 35/0006 |
| 2019/0358616 A1* | 11/2019 | Blakeman | ........... | B01J 29/7615 |

FOREIGN PATENT DOCUMENTS

| | | |
|---|---|---|
| EP | 2 695 674 A1 | 2/2014 |
| EP | 2 763 791 B1 | 9/2015 |
| WO | 2010/133309 A1 | 11/2010 |
| WO | 2011/057649 A1 | 5/2011 |
| WO | 2012/071421 A2 | 5/2012 |
| WO | 2012/079598 A1 | 6/2012 |
| WO | 2012/137930 A1 | 10/2012 |
| WO | 2013/050784 A2 | 4/2013 |

* cited by examiner

DIESEL OXIDIZING CATALYTIC CONVERTER

The present invention relates to an oxidation catalyst for purifying the exhaust gases of diesel engines.

In addition to carbon monoxide CO, hydrocarbons HC and nitrogen oxides $NO_X$, the raw exhaust of diesel engines contains a relatively high oxygen content of up to 15% by volume. Additionally, particulate emissions are included which predominantly consist of soot residues and in some cases organic agglomerates and result from a partially incomplete combustion of fuel in the cylinder.

While diesel particulate filters with and without catalytically active coating are suitable for removing the particulate emissions, and nitrogen oxides can be converted to nitrogen, for example, by selective catalytic reduction (SCR) in a so-called SCR catalyst, carbon monoxide and hydrocarbons are rendered harmless by oxidation in a suitable oxidation catalyst.

Oxidation catalysts are extensively described in the literature. These are, for example, so-called flow-through substrates made of ceramic or metal material, which carry as essential catalytically active constituents noble metals, such as platinum and palladium, on high-surface-area, porous, high-melting-point oxides, for example, aluminum oxide. Already zoned oxidation catalysts are also described which have, in the direction of flow of the exhaust gas, material zones of different composition, with which the exhaust gas comes into contact in succession.

For example, US2010/257843, US2011/099975, and WO2012/079598 A1-describe zoned oxidation catalysts which contain platinum and palladium. WO2011/057649 A1 also describes oxidation catalysts, wherein they can be used in layered and zoned embodiments. In the case of the zoned embodiments, the second zone, i.e. the zone with which the outflowing exhaust gas is in direct contact, has a higher noble metal content than the front zone, which is in direct contact with the incoming exhaust gas. The oxidation catalysts according to WO2011/057649 have the particular task of setting an optimum ratio of NO to $NO_2$ for an SCR catalyst on the outflow side. Further oxidation catalysts are disclosed in WO2010/133309 A1, WO2013/050784 A2, US2008/045405, WO2012/137930 A1 and WO2012/071421 A2.

EP2000639A1 describes oxidation catalysts which contain, in addition to platinum, an oxide of a metal selected from magnesium, alkaline earth metal and alkali metal. The function of the catalyst is to increase the exhaust gas temperature during fuel injection.

The exhaust gas temperatures of current and future diesel engines of Exhaust Legislation Euro 5, 6 and 6+ are getting increasingly lower due to fuel savings for lowering the $CO_2$ output. It is all the more important to have diesel oxidation catalysts which have a sufficient CO light off at low exhaust gas temperatures. The diesel oxidation catalysts known to date do not fulfill this condition sufficiently, so that there is a need for a corresponding further development.

It has now been found that the diesel oxidation catalysts described and defined below meet these conditions.

The present invention relates to a diesel oxidation catalyst comprising
a carrier body having a length L extending between a first end face a and a second end face b, and
variously composed catalytically active material zones A and B arranged on the carrier body, wherein
material zone A contains palladium or platinum and palladium in a weight ratio Pt:Pd of ≤1 and extends from end face a to 20 to 80% of length L, and
material zone B contains platinum and palladium in a weight ratio Pt:Pd of <10 and extends to 80 to 100% of length L, and
wherein material zone B is arranged above material zone A and the weight ratio Pt:Pd relative to the material zones A and B is 1.5 to 3.0.

In embodiments of the oxidation catalyst according to the invention, palladium or platinum and palladium are applied in the material zones A and B to one or more carrier oxides. These carrier oxides are advantageously high-melting, i.e, their melting point is at a sufficient distance above the temperatures occurring during the intended operation of the oxidation catalyst according to the invention. The carrier oxides are also advantageously of high surface area and preferably have specific surfaces of 50 to 200 $m^2/g$.

The carrier oxides in the material zones A and B may be identical or different.

Suitable carrier oxides are selected from the series consisting of aluminum oxide, doped aluminum oxide, silicon oxide, titanium dioxide and mixed oxides of one or more thereof. Doped aluminum oxides are, for example, aluminum oxides doped with silicon oxide, zirconium oxide and/or titanium oxide. Lanthanum-stabilized aluminum oxide is advantageously used, wherein lanthanum is used in amounts of from 1 to 10% by weight, preferably from 3 to 6% by weight, each calculated as $La_2O_3$ and relative to the weight of the stabilized aluminum oxide.

In embodiments of the oxidation catalyst according to the invention, material zone A comprises an alkaline earth metal. Magnesium, calcium, strontium, barium or mixtures of at least two of these metals can be used as alkaline earth metal. Strontium or barium is preferably used.

The alkaline earth metal or the alkaline earth metals are generally present in the form of their oxides, hydroxides or carbonates. They are preferably present in the form of their oxides.

The alkaline earth metal is advantageously used in an amount of 0.5 to 5% by weight based on the weight of the material zone A and calculated as MeO, wherein Me is the alkaline earth metal.

When strontium is used, it is particularly preferably present in an amount of from 1 to 3% by weight relative to the weight of the material zone A.

In contrast, if barium is used, it is particularly preferably present in an amount of 2.5 to 4.5% by weight relative to the weight of the material zone A.

Material zone A contains only palladium as noble metal, or it contains palladium and platinum, wherein the weight ratio Pt:Pd≤1, i.e., for example, 1 to 0.15.

Material zone B contains platinum and palladium as noble metal in a weight ratio Pt:Pd of <10, thus 3 to 6, for example. In particular, material zone B has a weight ratio Pt:Pd of <6.

The weight ratio Pt:Pd relative to the material zones A and B is, for example, 1.5 to 2.4.

In embodiments of the oxidation catalyst according to the invention, the material zones A and B are present independently of one another in amounts from 50 to 150 WI relative to the volume of the carrier body.

In embodiments of the oxidation catalyst of the present invention, the length of material zone A is 20 to 70%, 40 to 60%, or 45 to 50% of the overall length L of the carrier body.

Material zone B can extend over 80 to 100% of the length L starting from end face a or starting from end face b. Material zone B preferably extends from end face b over 80 to 100% of length L.

In embodiments of the oxidation catalyst of the present invention, the length of material zone B is 85%, 90%, 95% or 100% of the overall length L of the carrier body.

Oxidation catalysts according to the invention can be produced by coating suitable carrier bodies in a manner known per se by means of coating suspensions, so-called washcoats. To produce a coating suspension for producing the material zones A or B, the selected carrier oxides are suspended in water, for example. Platinum and/or palladium are then added to the suspension while stirring in the form of suitable, water-soluble precursor compounds, such as palladium nitrate or hexahydroxoplatinic acid, for example, and optionally fixed on the carrier material by setting the pH and/or by adding an auxiliary reagent.

Alternatively, the noble metal may also be applied to the carrier material in a manner analogous to the method described in EP 1,101,528 A2.

The suspensions obtained in this way are then ground and applied to the carrier body by one of the standard coating methods. After each coating step, the coated part is dried in a hot air stream and in some cases calcined.

The aforementioned precursors and auxiliary reagents are well known to those skilled in the art.

So-called honeycomb bodies made of ceramic, in particular cordierite, or of metal are particularly suitable as carrier bodies. So-called flow-through honeycomb bodies are preferably used. However, embodiments are also conceivable in which wall-flow filters are used as carrier bodies.

The diesel oxidation catalysts according to the invention are suitable for purifying the exhaust gases of diesel engines, in particular with regard to carbon monoxide and hydrocarbons.

The present invention thus also relates to a method for the treatment of diesel exhaust gases, which is characterized in that the diesel exhaust gas is conducted through a diesel oxidation catalyst as described and defined above, wherein the diesel exhaust gas flows into the carrier body at the end face a and flows out of the carrier body at the end face b.

The diesel oxidation catalysts according to the invention are used in particular as constituents of exhaust gas purification systems. In addition to a diesel oxidation catalyst according to the invention, corresponding exhaust gas purification systems include, for example, a diesel particulate filter and/or a catalyst for selective catalytic reduction of nitrogen oxides, wherein the diesel particulate filter and SCR catalyst are usually arranged downstream of the diesel oxidation catalyst according to the invention, that is on the outflow side. In one embodiment of the emission control system, the SCR catalyst is arranged on the diesel particulate filter.

EXAMPLE 1 a) A commercially available round flow-through substrate of cordierite having the dimensions 14.4 cm×10.2 cm (5.66"×4.00") with cell density 62 cpcm (400 cpsi) and wall thickness 165 μm (6.5 mils) was coated starting from one end (corresponding to end face a) over 50% of its length with a washcoat containing 48.23 Wl of a commercially available lanthanum doped aluminum oxide, 1.00 g/l strontium oxide (ex $Sr(OH)_2$), 0.47086 g/l of a standard water-soluble Pd compound, and 0.23543 g/l of a standard water-soluble Pt compound. The Pt:Pd weight ratio was 1:2.

b) The coated substrate obtained according to a) was coated over its entire length with a washcoat containing 49.23 g/l of a lanthanum-doped mesoporous aluminum oxide, 0.60540 g/l of a standard water-soluble Pt compound, and 0.10090 g/l of a standard water-soluble Pd compound. The Pt:Pd weight ratio was 6:1.

EXAMPLE 2 a) In a manner analogous to the method described in example 1, a commercially available round flow-through substrate made of cordierite having the dimensions 14.4 cm×10.2 cm (5.66"×4.00") with cell density 62 cpcm (400 cpsi) and wall thickness 165 μm (6.5 mils) was coated starting from one end (corresponding to end face a) over 80% of its length with a washcoat comprising 0.293 g/l (8.3 g/ft$^3$) platinum and palladium in a 1:1 weight ratio.

b) The coated substrate obtained according to a) was coated over its entire length with a washcoat comprising 0.473 g/l (13.4 g/ft$^3$) platinum and palladium in a 3:1 weight ratio. The total Pt:Pd ratio over the entire catalyst was 2:1.

COMPARATIVE EXAMPLE 1 a) In a manner analogous to the method described in example 1, a commercially available round flow-through substrate made of cordierite having the dimensions 14.4 cm×10.2 cm (5.66"×4.00") with cell density 62 cpcm (400 cpsi) and wall thickness 165 μm (6.5 mils) was coated over its entire length with a washcoat comprising 0.357 g/l (10.1 g/ft$^3$) platinum and palladium in a 1.4:1 weight ratio.

b) The coated substrate obtained according to a) was coated over its entire length with a washcoat comprising 0.350 g/l (9.9 g/ft$^3$) platinum and palladium in a 3:1 weight ratio.

The total Pt:Pd ratio over the entire catalyst was 2:1.

Comparative example 1 is analogous to example 6 of US2008/045405.

EXAMPLE 3 a) In a manner analogous to the method described in example 1, a commercially available round flow-through substrate made of cordierite having the dimensions 14.4 cm×10.2 cm (5.66"×4.00") with cell density 62 cpcm (400 cpsi) and wall thickness 165 μm (6.5 mils) was coated starting from one end (corresponding to end face a) over 80% of its length with a washcoat comprising 0.636 g/l (18 g/ft$^3$) platinum and palladium in a 1:1 weight ratio.

b) The coated substrate obtained according to a) was coated over its entire length with a washcoat comprising 0.198 g/l (5.6 g/ft$^3$) platinum and palladium in a 6:1 weight ratio.

The overall Pt:Pd ratio over the entire catalyst was 1.5:1.

COMPARATIVE EXAMPLE 2 a) In a manner analogous to the method described in example 1, a commercially available round flow-through substrate made of cordierite having the dimensions 14.4 cm×10.2 cm (5.66"×4.00") with cell density 62 cpcm (400 cpsi) and wall thickness 165 μm (6.5 mils) was coated over its entire length with a washcoat comprising 0.618 g/l (17.5 g/ft$^3$) platinum and palladium in a weight ratio of 1:2.

b) The coated substrate obtained according to a) was coated starting from one end (corresponding to end face a)

over 50% of its length with a washcoat comprising 0.177 g/l (5 g/ft$^3$) platinum and palladium in a 1:2 weight ratio.

The overall Pt:Pd ratio over the entire catalyst was 1.2.

Comparative example 2 is analogous to catalyst Y of WO2010/133309 A1.

Comparative Experiments

With examples 2 and 3, as well as comparative examples 1 and 2, so-called heat-up experiments were carried out. To this end, on a conventional passenger car engine test bench (2.0 L displacement, 4 cylinder, diesel, TDI, common rail), energy in the form of heat was released (exothermically) via secondary fuel injection by catalytic combustion of that very fuel above the diesel oxidation catalyst to be tested in each case.

A constant pre-catalyst temperature of 320° C. was set in a first engine operating point (MBP1). A theoretically expected post-catalyst temperature was then reached (or not reached) in precisely defined steps by injection of exactly calculated quantities of diesel fuel. The aim is to successively realize a post-catalyst temperature of approx. 550° C. in four defined equidistant steps from the given pre-catalyst temperature. This four-stage procedure at a pre-catalyst temperature of 320° C. is subsequently repeated again at pre-catalyst temperatures of 310° C. at an engine operating point 2 (MBP2), at a pre-catalyst temperature of 300° C. at an engine operating point 3 (MBP3) and at a pre-catalyst temperature of 290° C. at an engine operating point 4 (MBP4).

It tends to be more important to evaluate MBP4 than MBP3, more important to evaluate MBP3 than MBP2 and more important to evaluate the latter than MBP1, since it becomes increasingly difficult to generate the required heat at lower pre-catalyst temperature by means of excellent ignition behavior.

In this test, the suitability of an oxidation catalyst to initiate the thermal regeneration of a downstream diesel particulate filter is tested. The higher the temperature reached is, the better suited is the oxidation catalyst.

FIG. 1 shows the comparison of example 2 (solid line) with comparative example 1 (dashed line). Accordingly, example 2 produces a significantly higher exothermic reaction than comparative example 1 and is thus better suited to initiate the thermal regeneration of a downstream diesel particulate filter.

Figure 2:
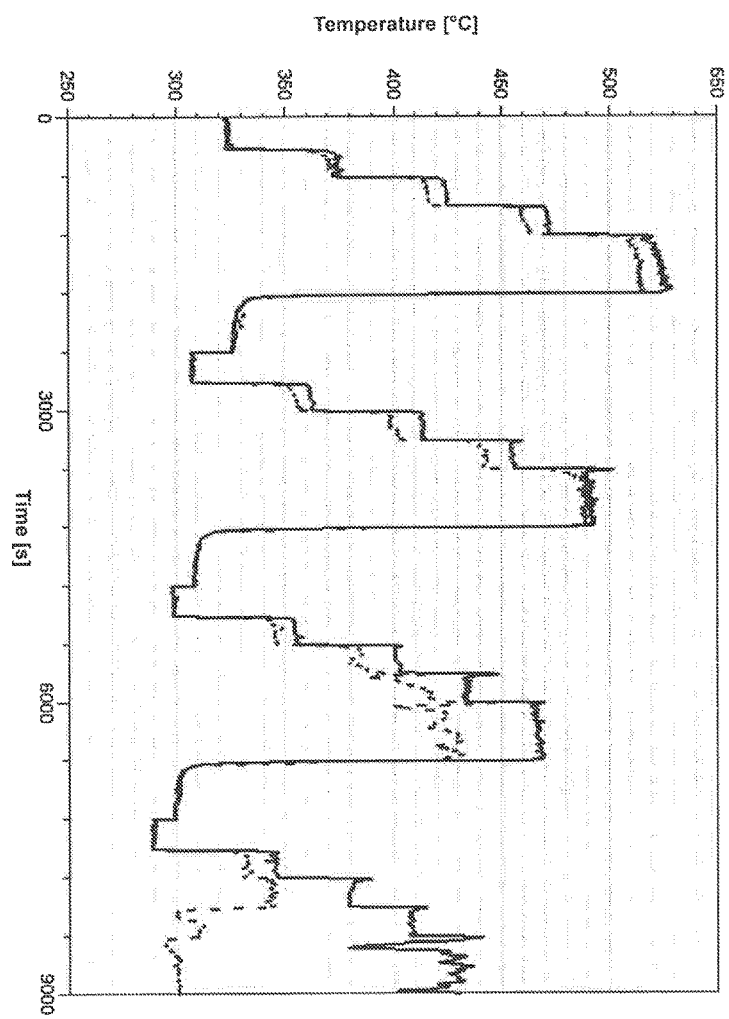

FIG. 2 shows the comparison of example 3 (solid line) with comparative example 2 (dashed line). Accordingly, example 3 produces a significantly higher exothermic reaction than comparative example 2 and is thus better suited to initiate the thermal regeneration of a downstream diesel particulate filter.

The invention claimed is:

1. Diesel oxidation catalyst comprising
a carrier body having a length L extending between a first end face a and a second end face b, and
differently composed catalytically active material zones A and B arranged on the carrier body, wherein
material zone A contains palladium or platinum and palladium in a weight ratio Pt:Pd of ≤1 and extends starting from end face a to 20 to 80% of length L, and
material zone B contains platinum and palladium in a weight ratio Pt:Pd of <10 and extends to 80 to 100% of length L, and
wherein material zone B is arranged above material zone A and the weight ratio Pt:Pd relative to the material zones A and B is 1.5 to 3.0.

2. The diesel oxidation catalyst according to claim 1, further comprising carrier oxides, and wherein in the material zones A and B, palladium or platinum and palladium are present on the carrier oxides.

3. The diesel oxidation catalyst according to claim 2, wherein the carrier oxides that are present in material zones A and B are identical to or different from one another and are selected from the group consisting of aluminum oxide, doped aluminum oxide, silicon oxide, titanium dioxide and mixed oxides of one or more thereof.

4. The diesel oxidation catalyst according to claim 1, wherein the material zone A contains an alkaline-earth metal.

5. The diesel oxidation catalyst according to claim 4, wherein the alkaline-earth metal in material zone A is strontium, barium, or strontium and barium.

6. The diesel oxidation catalyst according to claim 1, wherein the length of the material zone B is 95% or 100% of the total length L of the carrier body.

7. The diesel oxidation catalyst according to claim 1, wherein the material zone B contains platinum and palladium in a weight ratio Pt:Pd of 3.0 to <10.

8. The diesel oxidation catalyst according to claim 1, wherein the material zone B contains platinum and palladium in a weight ratio Pt:Pd of 3.0 to 6.0.

9. The diesel oxidation catalyst according to claim 1, wherein the length of the material zone A is 50% to 80%.

10. The diesel oxidation catalyst according to claim 1, wherein the material zone A comprises an alkaline-earth metal selected from the group consisting of strontium, barium, or strontium and barium in an amount of 0.5 to 5% by weight of the material zone A.

11. The diesel oxidation catalyst according to claim 1, wherein the material zone A includes strontium in an amount of 1 to 3% by weight of the material zone A.

12. The diesel oxidation catalyst according to claim 1, wherein the material zone A includes barium in an amount of 2.5 to 4.5% by weight of the material zone A.

13. The diesel oxidation catalyst according to claim 1, wherein the material zone A includes platinum and palladium in a weight ratio Pt:Pd of 1 to 0.15.

14. The diesel oxidation catalyst according to claim 13, wherein the material zone B contains platinum and palladium in a weight ratio Pt:Pd of 3.0 to 6.0.

15. The diesel oxidation catalyst according to claim 1, wherein the Pt:Pd ratio in zone A results in more Pd than Pt.

16. The diesel oxidation catalyst according to claim 1, wherein the weight ratio Pt:Pd relative to the material zones A and B is 1.5 to 2.4.

17. The diesel oxidation catalyst according to claim 1, wherein both Pt and Pd are present in each of zones A and B.

18. A method for treating diesel exhaust gases wherein the diesel exhaust gas is conducted through a diesel oxidation catalyst according to claim 1, wherein the diesel exhaust gas flows into the carrier body at end face a and flows out of the carrier body at end face b.

19. A device for purification of exhaust gases from diesel engines comprising a diesel oxidation catalyst according to claim 1.

20. A device for purification of exhaust gases from diesel engines comprising a diesel oxidation catalyst according to claim 1, wherein the diesel oxidation catalyst is arranged upstream of a diesel particulate filter and/or a catalyst for the selective catalytic reduction of nitrogen oxides.

* * * * *